United States Patent [19]

Ezis et al.

[11] Patent Number: 4,501,723

[45] Date of Patent: Feb. 26, 1985

[54] METHOD OF MAKING YTTRIUM SILICON OXYNITRIDES

[75] Inventors: Andre Ezis, Grosse Ile; Howard D. Blair, Romulus, both of Mich.

[73] Assignee: Ford Motor Company, Dearborn, Mich.

[21] Appl. No.: 527,643

[22] PCT Filed: Jul. 19, 1983

[86] PCT No.: PCT/US83/01115

§ 371 Date: Jul. 19, 1983

§ 102(e) Date: Jul. 19, 1983

[51] Int. Cl.³ .................. C04B 35/58; C01F 17/00
[52] U.S. Cl. ........................ 423/263; 501/97; 501/98
[58] Field of Search .............. 501/97, 98; 264/65; 423/263

[56] References Cited

U.S. PATENT DOCUMENTS

| | | | |
|---|---|---|---|
| 4,102,698 | 7/1978 | Lange et al. | 501/98 |
| 4,331,771 | 5/1982 | Washburn | 501/97 |
| 4,341,874 | 7/1982 | Nishada et al. | 501/98 |
| 4,350,771 | 9/1982 | Smith | 501/97 |

*Primary Examiner*—Mark Bell
*Attorney, Agent, or Firm*—Joseph B. Malleck; Olin B. Johnson

[57] ABSTRACT

A method of making a powder additive consisting of yttrium silicon oxynitrides, preferably of the $Y_{10}Si_6O_{24}N_2$ or $YSiO_2N$ phases, is disclosed. Stoichiometric amounts of $Y_2O_3$, $SiO_2$, and $Si_3N_4$ are mixed and arranged in intimate reactive contact, the amounts being to form a desired oxynitride according to the formula $Y_aSi_bO_cN_d$, where a, b, c and d represent the required element parts of the compound in equilibrium with the mixture elements. The mixture is heated in an inert atmosphere to a temperature and for a time sufficient to convert the stoichiometric amounts of the mixture to the desired yttrium silicon oxynitride. The heat agglomerated mixture is then ground to a powder.

6 Claims, No Drawings

4,501,723

METHOD OF MAKING YTTRIUM SILICON OXYNITRIDES

TECHNICAL FIELD

The invention relates to the art of making silicon oxynitrides and, more particularly, yttrium silicon oxynitrides.

BACKGROUND OF THE INVENTION AND PRIOR ART STATEMENT

Until recently, the prior art had not made yttrium silicon oxynitrides independently so that they could be used as a powder additive for a variety of subsequent chemical processes. Oxynitrides, if formed at all, were formed as a comingled byproduct of heating, such as by hot pressing a ternary system of silicon nitride, and two oxides used as hot pressing aids (see U.S. Pat. Nos. 4,102,698; 4,341,874; and 4,350,771). In each of these patents, a compact of the ternary powder system is sintered to a relatively high density during which secondary phases form, which may include oxynitrides. Of course, the process was not aimed at producing an oxynitride that could be extracted for other uses. The high density of the resulting product made it very difficult to separate out any oxynitrides that had been formed and even more difficult to convert the high density sintered product into a reground powder. But, more importantly, the purity and type of second phases produced as a result of such sintering could not be accurately controlled, and the chemistry constraints imposed by the presence of excess silicon nitride inhibited the formation of desired or selected yttrium silicon oxynitrides.

A recent effort (see U.S. Pat. No. 4,331,771) has been made to produce bonded silicon oxynitrides for utility as a structural material. In this effort, silicon powder and oxides are reacted in the presence of an oxygen/nitrogen atmosphere. The method is designed to provide for a strong and dense oxynitride body required by the utilization of the body, which strength can be obtained only by the presence of impure substances in the oxynitride body.

What is needed is a method by which a low density, pure form of the oxynitride can be made economically for other uses with minimal regrinding. There is a need for a method by which stoichiometric amounts of the ingredients needed for a specific oxynitride can be chemically reacted to form the specific compound without byproducts and contaminating chemical reactions.

SUMMARY OF THE INVENTION

The invention is a method of making yttrium silicon oxynitrides of the formula $Y_aSi_bO_cN_d$, by the steps comprising: (a) mixing together, in intimate reactive contact, stoichiometric amounts of $Y_2O_3$, $SiO_2$, and $Si_3N_4$ to form a desired yttrium silicon oxynitride where a, b, c, and d represent the required element parts of the compound in equilibrium with the mixture element parts (when necessary, this requires taking into account the amount of $SiO_2$ that is present as an oxide coating on the $Si_3N_4$); (b) bearing the mixture in an inert atmosphere to a temperature level and for a time sufficient to convert the stoichiometric amounts of the mixture to the desired yttrium silicon oxynitride; and (c) grinding said heat agglomerated mixture to a powder.

It is preferable to heat the mixture to the temperature range of 1500°–1550° C. for at least 6 hours to produce low density $Y_{10}Si_6O_{24}N_2$ (hereafter $Y_{10}$ phase), and to heat the mixture to the temperature range of 1600°–1650° C. for at least 6 hours to produce low density $YSiO_2N$ phase (hereafter $Y_1$ phase). The lower temperatures and longer times of heating result in a low density (preferably no greater than 2.1 $gm/cm^3$) for the heated powder. AS heating progresses in the nitrogen atmosphere, reaction gases may form (such as SiO) and form part of the atmosphere. Excess $SiO_2$ may be needed in the initial charge to account for the SiO volatilization.

BEST MODE FOR CARRYING OUT THE INVENTION

A preferred method for carrying out the subject invention is as follows.

1. Mixing Stoichiometric Amounts of Ingredients

Yttrium silicon oxynitride, according to the formula $Y_aSi_bO_cN_d$, is made by mixing together stiochiometric amounts of $Y_2O_3$, $SiO_2$, and $Si_3N_4$ to form a specific yttrium silicon oxynitride compound. The subscripts a, b, c, and d represent the required element parts of the compound equilibrated with the mixture element parts. A preferred oxynitride, having the formula $Y_{10}Si_6O_{24}N_2$, can be prepared by the nominal mixing together of 10 parts of $Y_2O_3$, 9 parts $SiO_2$, and 1 part $Si_3N_4$, heating the mixture in a nitrogen atmosphere to a temperature level of 1500°–1550° C. for a period in excess of 6 hours, preferably 7 hours, to a density of about 2 $gm/cm^3$, and then regrinding the heat agglomerated mixture to a powder again. It is desirable that the regrinding be minimal as facilitated by the low density of heated mass and thereby avoid grinding contaminant. The resultant powder is thus useful as a relatively pure chemical additive in the desired crystalline form and phase.

Alternatively, the phase of $YSiO_2N$ may be formed by mixing together 2 parts $Y_2O_3$, 1 part $SiO_2$, 1 part $Si_3N_4$, and heating the mixture in a nitrogen atmosphere to a temperature level of 1600°–1650° C. for a period in excess of 6 hours, preferably 8 hours, to a density of approximately 2.0 $gm/cm^3$.

In the above modes, a specific temperature range and stoichiometric amount was required to make the method operate properly. The purity preferred for the yttria powder was 99.99% or greater, for the $SiO_2$ it was 99.5% or greater, and for the $Si_3N_4$ it was 99.0% or greater. Each of the ingredients preferably should have a particle size of: silicon nitride less than 10 microns and an average particle size of 2–3 microns, $Y_2O_3$ of 10 microns or less and an average particle size of about 2 microns, an $SiO_2$ of less than 10 microns and an average of about 2°–3 microns. Mixing may be carried out in a milling apparatus which provides homogeneity with little change in particle size.

Preferably, the milled mixture is compacted for ease of handling and placement in a furnace and to ensure intimate reactive contact during firing. However, the mixture may also be placed in a furnace dish and heated in the loose aggregate form with some sacrifice in chemical conversion efficiency.

2. Heating

The mixture or compact is heated in an inert atmosphere without mechanical pressure to convert the ingredients to the oxynitride compound. The furnace is preferably evacuated to a pressure of less than 1 micron and heated at a fast rate, i.e., 500° F./hr (278° C./hr) to 1200° F. (649° C.) and preferably even faster (such as 1000° C./hr). The furnace is then filled with gaseous nitrogen mixture, the total $O_2$ and $H_2O$ content of such gaseous mixture being less than about 4 ppm. The temperature of the furnace is then increased up to the desired target level of, for example, 1500°–1550° C. for making the $Y_{10}$ phase, or to the level of 1600°–1650° C. for making the $Y_1$ phase. Some of the $SiO_2$ may volatilize and form SiO vapor and may have to be accounted for in the initial charge.

3. Grinding

The heat agglomerated mixture is then comminuted to a loose powder form, preferably using a conventional ball milling apparatus. In this apparatus, a batch of the heated agglomerated mixture is broken down by milling media in the form of $Si_3N_4$ cylinders ($\frac{1}{2}''$ diameter by $\frac{1}{2}''$ length). The milling may be carried out with a small addition of acetone for 1–6 hours and then heated to remove the acetone.

EXAMPLES

To form the $Y_{10}Si_6O_{24}N_2$ phase, a 100 gram batch or mixture was prepared consisting of 4.773 grams of $Si_3N_4$ powder, 76.82 grams of $Y_2O_3$ powder, and 18.399 grams amorphous $SiO_2$ (without taking into consideration $SiO_2$ present as an oxide on the $Si_3N_4$). The mixture was lightly compacted into a BN container, using about 10 psi. The container was placed in a furnace evacuated to 1 micron and heated to 1200° F. (649° C.) at a fast rate of 500° C./hr or higher. The temperature was held for one hour and them relatively pure $N_2$ gas was added to the furnace. The container was then heated to 1550° C. at a rate of 200°–300° C./hr. The container was held at this temperature for six hours. The container, upon cooling, possessed about 100 grams of a $Y_{10}Si_6O_{24}N_2$ cake. The cake was then ground to a powder form.

The resulting powder contains at least 99% of the $Y_{10}$ phase if it is to be useful as a crystalline chemical additive for cutting tool applications. However, for some applications, as low as 75% conversion may be acceptable. Deviation from the heating rate, time of heating, and equilibrium temperature conditions in the furnace will cause less than 100% of $Y_{10}$ phase to form.

To make a 100 gram batch of essentially single phase $YSiO_2N$, a mixture was prepared consisting of 22.0 grams of $Si_3N_4$, 8.7 grams $SiO_2$ (assumes 2.3% $SiO_2$ on $Si_3N_4$ as an oxide layer) and 69.3 grams of $Y_2O_3$. The mixture was again hand pressed into a furnace container, heated to 1650° C. for 6 hours, and cooled down reasonably fast.

The heating may be carried out according to a typical nitriding cycle, but such cycle is not cost effective because extremely long periods of time are required and the conversion to oxynitrides is not as predictable.

We claim:
1. A method of making yttrium silicon oxynitrides according to the formula $Y_aSi_bO_cN_d$, by the steps comprising:
    (a) mixing together, in intimate reactive contact, stoichiometric amounts of $Y_2O_3$, $SiO_2$, and $Si_3N_4$ to form a desired yttrium silicon oxynitride where a, b, c, and d represent the required element parts of the compound in equilibrium with the mixture element parts, said $SiO_2$ may be present as an oxide coating on said $Si_3N_4$;
    (b) heating the mixture in an inert atmosphere to a temperature level and for a time sufficient to convert the stoichiometric amounts of the mixture to the desired yttrium silicon oxynitride; and
    (c) grinding said heat agglomerated mixture to a powder.
2. The method as in claim 1, in which said atmosphere is comprised of nitrogen.
3. The method as in claim 1, in which said heating is carried out to form a yttrium silicon oxynitride of a density no greater than 2.1 gm/cm$^3$.
4. The method as in claim 1, in which said heating is carried out for a time in excess of six hours.
5. A method of making yttrium silicon oxynitride by the steps comprising:
    (a) mixing together, in intimate reactive contact, 10 parts of $Y_2O_3$, nine parts of $SiO_2$, and one part of $Si_3N_4$ to form $Y_{10}Si_6O_{24}N_2$, said $SiO_2$ may be present as an oxide coating on said $Si_3N_4$;
    (b) heating the mixture in an inert atmosphere to a temperature level of 1500°–1550° C. and for a time in excess of six hours sufficient to convert the mixture to $Y_{10}Si_6O_{24}N_2$ with a density of about 2.0 gm/cm$^3$; and
    (c) grinding said heat agglomerated mixture to a powder.
6. A method of making yttrium silicon oxynitride by the steps comprising:
    (a) mixing together, in intimate reactive contact, two parts of $Y_2O_3$, one part of $SiO_2$, and one part of $Si_3N_4$ to form $YSiO_2N$, said $SiO_2$ may be present as an oxide coating on said $Si_3N_4$;
    (b) heating the mixture in a nitrogen atmosphere to a temperature level of 1600°–1650° C. and for a time in excess of six hours sufficient to convert the mixture to $YSiO_2N$; and
    (c) grinding said heat agglomerated mixture to a powder.

* * * * *